INVENTORS
ARTHUR N. WELLS
BERNE TOCCI-GUILBERT
CONRAD W. RENSTROM
BY Naylor and Lascagne
ATTORNEYS

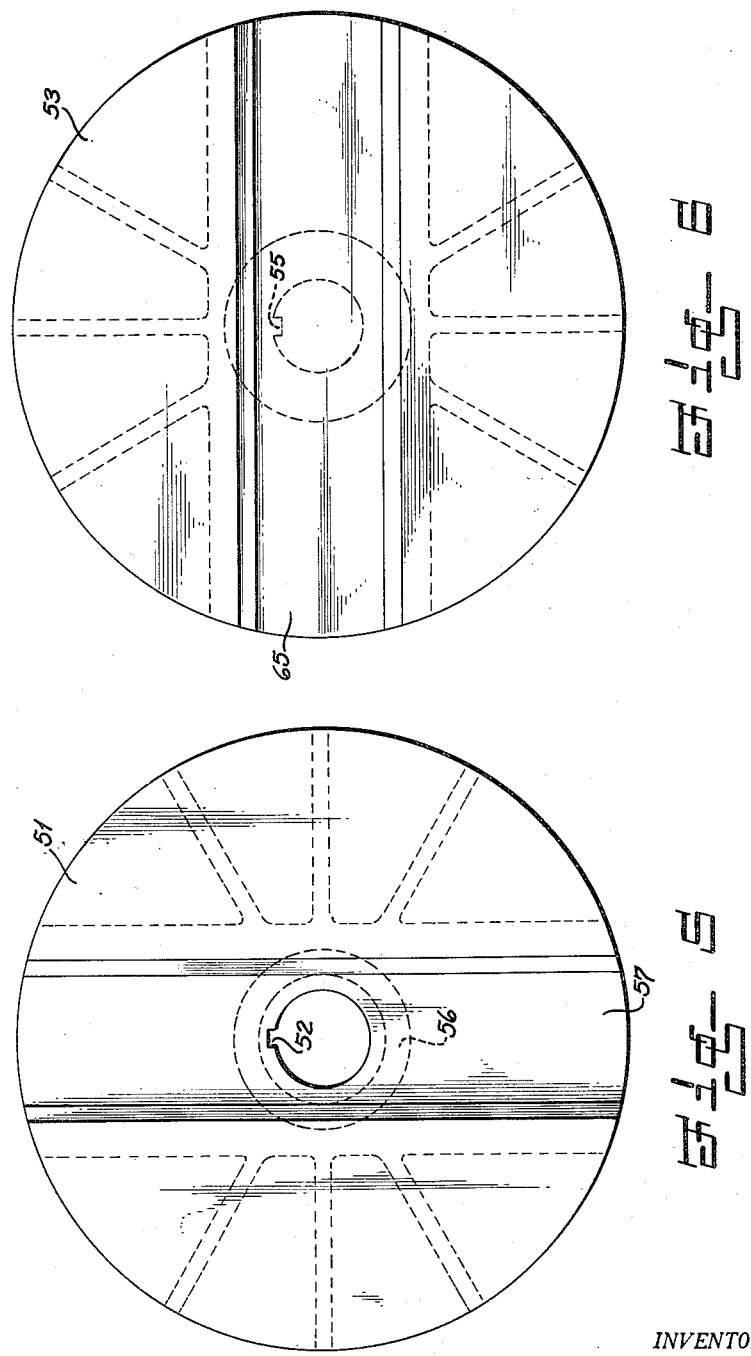

Patented Aug. 26, 1952

2,608,101

UNITED STATES PATENT OFFICE 2,608,101

MOTION TRANSLATING MECHANISM

Arthur N. Wells, San Bruno, Berne Tocci-Guilbert and Conrad W. Renstrom, San Francisco, Calif.

Application August 12, 1949, Serial No. 109,926

5 Claims. (Cl. 74—50)

1

The present invention relates to mechanisms for translating rotary motion into reciprocatory motion and more particularly to improvements therein whereby the magnitude of the reciprocatory movement may be varied by adjustment of the mechanism.

The invention contemplates the employment of a relatively simple assembly adapted for enclosure in an oil-tight housing provided with apertures only for the drive-shaft, the reciprocatory driven element, the adjusting member and, if desired, an indicator whereby the state of adjustment is shown.

In general, an embodiment of the present invention employs an eccentrically movable rotor suspended between a rotatable driving member and an adjustable control member by connections which permit the rotor to move with respect to these two members in directions which are at a right angle to each other. Any appropriate arrangement may be employed to effect rotation of the driving member, to take off the eccentric motion of the rotor and to adjust the control member in such a way as to cause the rotor to move with varying amounts of eccentricity with respect to the driving member.

The essential features of the invention are defined with particularity in the appended claims; but the invention itself, together with particular objects and advantages thereof, will be best understood from the following description of a preferred form in which it has been embodied, reference being had to the accompanying drawings, in which:

Figure 5 is a view in elevation of the face of the driving portion of the rotor; and Figure 6 is a view in elevation of the face of the driven portion of the rotor.

Figure 1:
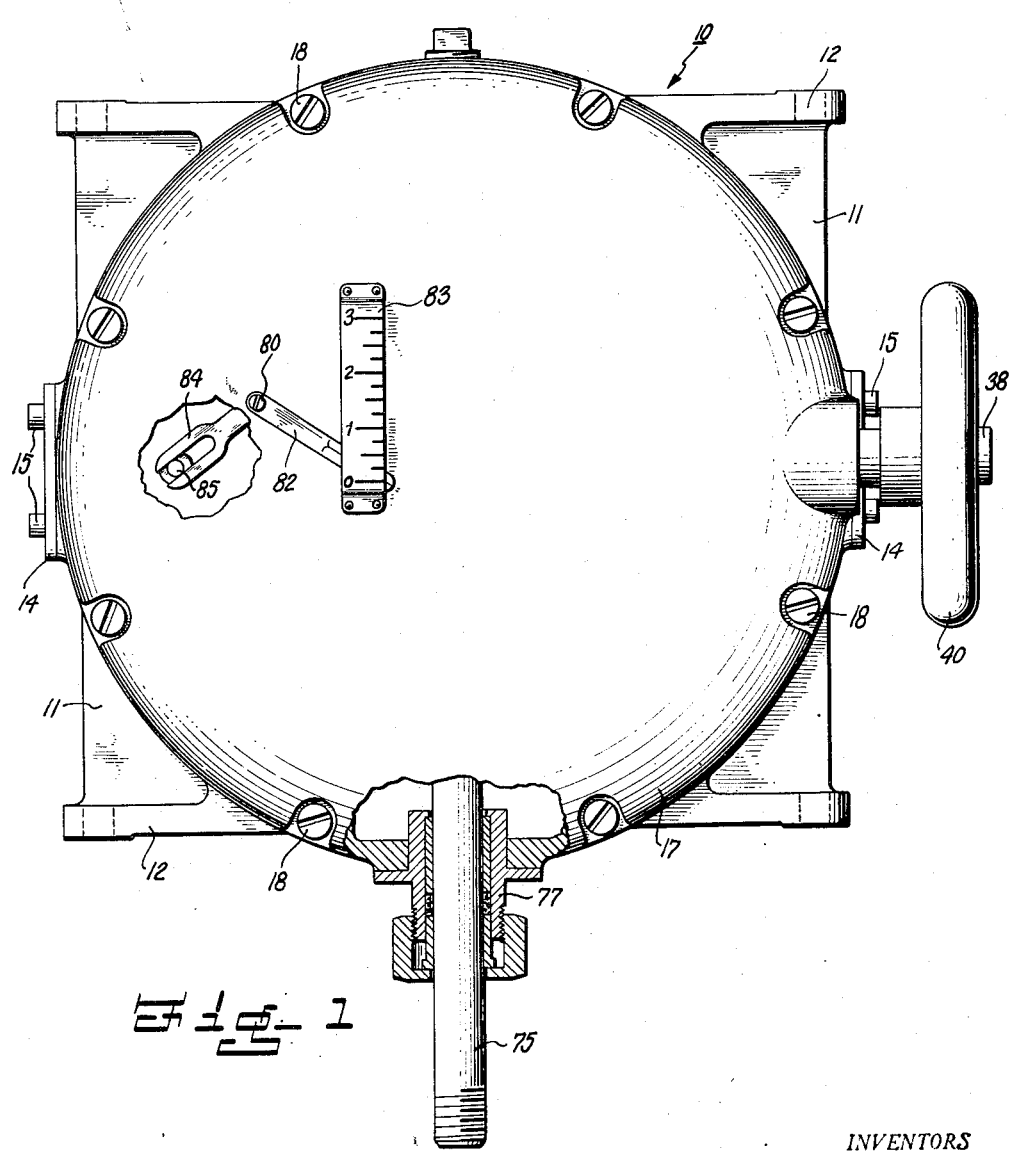
Figure 1 is a side view in elevation of an adjustable stroke motion translating mechanism embodying the present invention, portions of the housing being broken away and certain of the exposed parts being shown in section.
Figure 2:
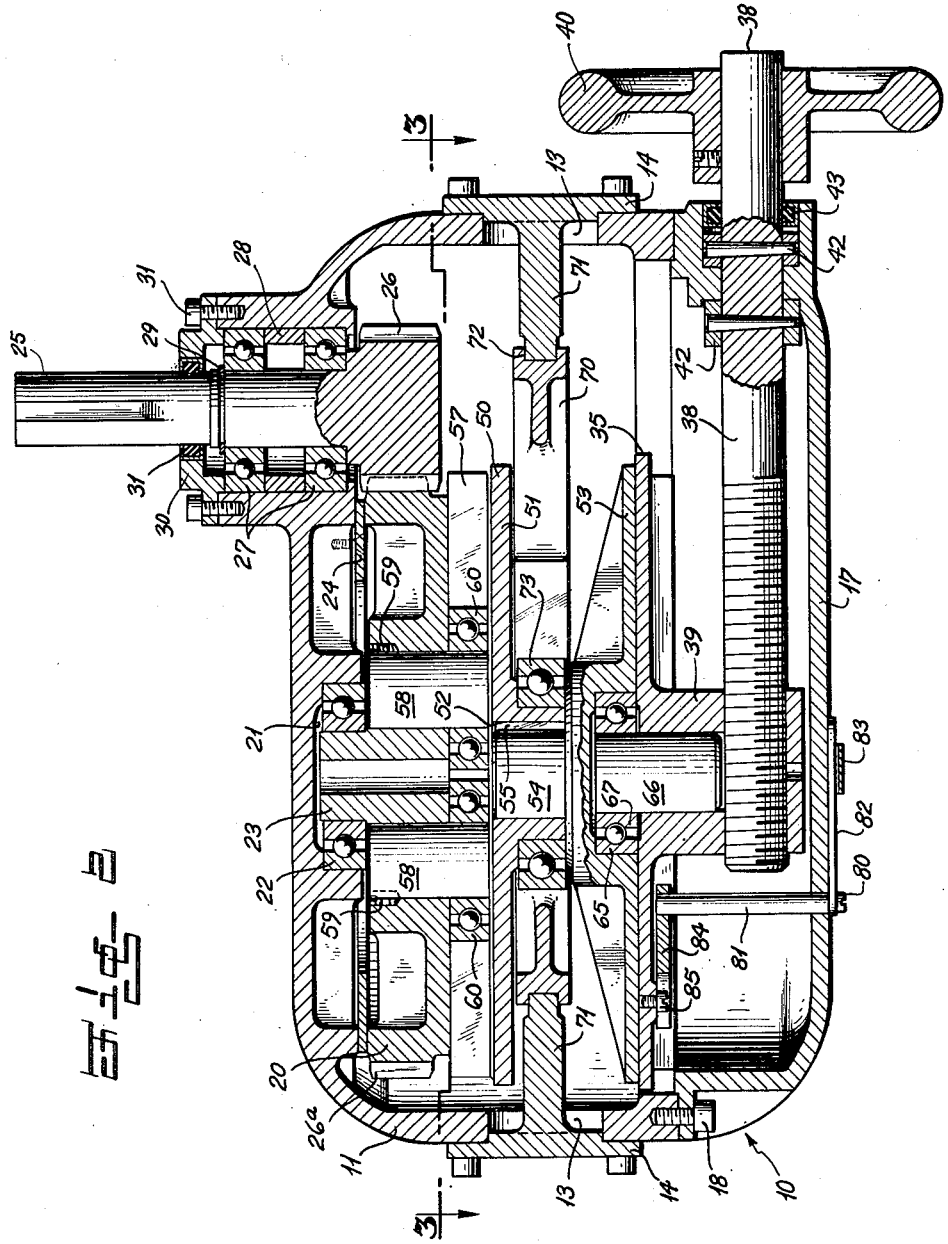
Figure 2 is a sectional view of the mechanism of Figure 1 taken on a horizontal plane.
Figure 3:
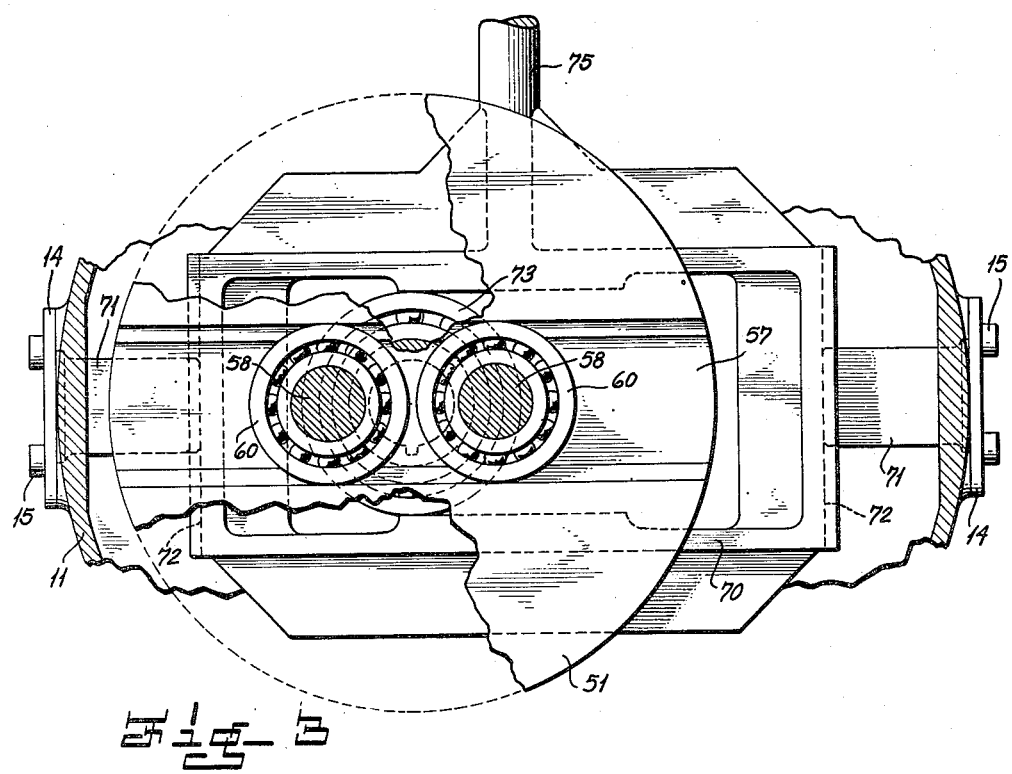
Figure 3 is a partial sectional view of the mechanism taken on the line 3—3 of Figure 2.
Figure 4:
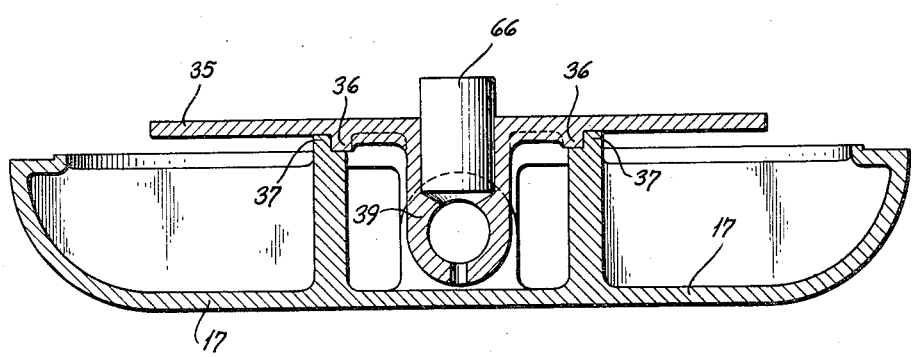
Figure 4 is a detail view, in section, of the housing cover showing control member mounted thereon.

In the embodiment illustrated, the mechanism is shown as enclosed in an oil-tight housing 10, as is preferable where the mechanism is to operate for extended periods without frequent lubrication. The housing 10 comprises a main housing 11 and is preferably provided with mounting lugs 12 and with apertures 13 sealed by flanges 14 secured in place as by cap screws 15. Also forming a part of the housing 10 is a housing cover 17 held in place on the main housing 11 as by cap screws 18.

A rotatable driving member 20 is journaled in a recess 21 within the housing 10; a ball-bearing assembly 22 being interposed between the wall of the recess and a central shaft 23 of the member 20 and a thrust ring 24 being secured to the inner wall of the housing 10 adjacent to a face near the periphery of the member 20. Rotational movement is transmitted to the member 20 from any desired source by a drive shaft 25 journaled in and extending through a wall of the housing 10; ball-bearing assemblies 27 separated by a spacer 28 and retained by an arcuate spring clip 29 seated in a groove in shaft 25 and by a seal housing plate 30 including an oil seal 31 secured in place as by cap screws 32 providing for free rotation of the shaft 25 while maintaining the housing oil-tight. Secured to shaft 25 is a pinion gear 26 meshing with teeth 26a on the periphery of member 20.

An adjustably positionable control member 35 is disposed within the housing 10. Guide ribs 36 on one face of the member 35 lie between complementary guide ribs 37 on the inner face of the housing cover 17 so as to slidably mount the control member 35 and adjustment thereof along the path to which it is thus constrained is effected by means extending through an aperture in the housing 10, such as a lead screw 38 the threads of which engage threads within a boss 39 of the control member 35, and which is provided with a hand wheel 40 exteriorly of the housing 10. The lead screw 38 is journaled in an aperture in the housing cover 17 and held against axial movement by collars 42 pinned to the lead screw. An oil seal 43 is preferably provided to seal the casing aperture.

An eccentrically movable rotor 50 is suspended between the driving, or drive-transmitting, member 20 and the control member 35. In the particular embodiment illustrated the rotor 50 is made in two parts; a driver portion 51 provided with a centrally apertured hub 56 having a keyway 52, and a driven portion 53 having a central hub 54 provided with a keyway 55 into which a key 55a is fitted so that the two portions are functionally integral.

The rotor 50 is connected to the rotatable drive-transmitting member 20 by a rotational driving connection which permits relative movement of the rotor and the drive-transmitting member constrained to a path diametrical of the drive-transmitting member. In the particular embodiment of the invention illustrated, this driving connection is in the form of a diametrical slot 57 in the face of the driving portion 51 of rotor 50 into which slot extend pins 58 secured to member 20 as by screws 59; the centers of pins 58 lying on a diameter of member 20. Preferably, ball-bearing assemblies 60 are interposed between the pins 58 and the walls of slot 57 to reduce friction.

The rotor 50 is also connected to the control member 35 by a pivotal connection permitting movement of the rotor with respect to the control member constrained to a path which is diametrical of the rotor and at a right angle, or normal to, the path of relative movement of the rotor and the movement-transmitting member 20. In the particular embodiment of the invention illustrated, the driven portion 53 of the rotor 50 is provided with a diametrical slot 65 extending in a direction at a right angle to the direction of the slot 57 into which slot extends a pin 66 secured to the control member 35. Preferably, a ball bearing assembly 67 is interposed between the pin 66 and the walls of slot 65 to reduce friction.

For the purpose of taking off the eccentric motion of the rotor 50 and delivering it as reciprocatory movement, a yoke 70 is reciprocably mounted within the housing 10, surrounding the hub 56 of rotor 50. Yoke 70 is guided by lateral guides 71, preferably integral with flanges 14, which guides extend into slots 72 in the edges of yoke 70, and preferably a ball bearing assembly 73 is interposed between the hub 56 and the interior margins of yoke 70 to reduce friction. A thrust rod 75 secured to the yoke 70 between guides 71 extends through a stuffing box assembly 77 secured in an aperture in housing 10 and may be conveniently attached to parts to be reciprocably driven by the mechanism of the present invention.

It is desirable, though not essential, to provide, as shown in the present embodiment, means for indicating the position of the control member 35 in order to determine the magnitude of reciprocatory movement of thrust rod 75. For this purpose, there is pivotally mounted in a wall of the housing 10 an indicator assembly 80 which comprises a shaft 81 extending through the housing wall and having an indicator 82 secured to the outer end thereof in indicating relationship with a scale 83 secured to the outside of the housing 10. Secured to the inner end of shaft 81 is a bifurcated arm 84 embracing a pin or screw 85 fixed in control member 35 at a point so offset from the axis of shaft 81 as to impart oscillatory movement to the shaft 81 as an incident to sliding movement of member 35, thus moving indicator 82 along scale 83 a distance proportionate to the adjusting movement of the control member 35.

The construction thus described is such that, if the control member 35 be adjusted to a position in which its pin 66 is coaxial with the central shaft 23 of the driving member 20, the rotor 50 will, of necessity, be coaxial with the driving member 20 and rotation of the latter will merely rotate the rotor 50 without imparting any reciprocation to the yoke 70 and thrust rod 75. However, if the control member 35 be adjusted, as by rotation of hand wheel 40, to a position in which the pin 66 is not coaxial with the shaft 23, then rotation of the driving member 20 will impart to rotor 50 an eccentric motion in which the axis of rotor 50 will move in a circle tangent to the axes of driving member 20 and control pin 66; the diameter of the circle in which the axis of rotor 50 moves being equal to the distance by which the control plate pin 66 is removed from coaxiality with drive member 20. The angular velocity of this circular movement of the axis of rotor 50 is twice the angular velocity of drive member 20.

Of particular advantage is the fact that adjustment of the control plate 35 can be effected at any time, whether operating or not.

Although the present invention has been described herein as embodied in a device used to translate rotary into reciprocatory motion, it is also adapted to translate reciprocatory into rotational motion.

Many alterations in details of construction described herein will be apparent to those skilled in the art to which the invention appertains as, for example, alterations in the form of the driving connection between the driving member and rotor and/or in the form of the pivotal connection between the rotor and the control member. The invention is not to be regarded as restricted to the form illustrated, therefore, except in so far as may be required by the lawful interpretation of the following claims.

What is claimed is:

1. In a device of the class described, a rotatable movement-transmitting member, an adjustably positionable control member, a rotor disposed between said members, a rotational and slidable driving connection between said movement-transmitting member and said rotor permitting relative movement of said rotor and said movement-transmitting member constrained to a path diametrical of said movement-transmitting member, a pivotal and slidable connection between said control member and said rotor operable during rotation of said movement-transmitting member to permit movement of said rotor with respect to said control member constrained to a path normal to the path of relative movement of said rotor and said movement-transmitting member, and means for adjustably positioning said control member.

2. A device of the class described according to claim 1 including a longitudinally movable element having an operating connection with said rotor for translating eccentric motion of said rotor to longitudinal reciprocation of said element.

3. In a device of the class described, a rotatably mounted movement-transmitting member, an adjustably positionable control member spaced apart from said movement-transmitting member and independent thereof, means for adjustably positioning said control member along a line parallel to a radius of said movement-transmitting member, a rotor disposed between said members, a rotational driving connection between said movement-transmitting member and said rotor including means defining a path for relative movement of said movement-transmitting member and said rotor which path is diametrical of said movement-transmitting member, and a pivotal connection between said control member and said rotor including means defining a path for movement of said rotor with respect to said control member which path is normal to the path of relative movement of said rotor and said movement-transmitting member.

4. A device of the class described according to claim 3 including a longitudinally movable element having an operating connection with said rotor for translating eccentric motion of said rotor to longitudinal reciprocation of said element.

5. In a device of the class described, a rotatable movement-transmitting member, a control member in spaced relation thereto and axially alignable therewith, means for adjustably positioning said control member to axially misalign said member with respect to said movement-transmitting member and to control the degree of misalignment, a rotor disposed between said members, and means for moving said rotor bodily in a circular path so that the axis of the rotor describes a circle the diameter of which is equal to the distance of offset between the axis of the control member and the fixedly positioned axis of the movement-trasmitting member comprising a rotational driving connection between said movement-transmitting member and said rotor permitting relative movement of said rotor and said movement-trasmitting member constrained to a path diametrical of said movement-trasmitting member and a pivotal connection between said control member and said rotor permitting movement of said rotor with respect to said control member constrained to a path normal to the path of relative movement of said rotor and said movement-trasmitting member.

ARTHUR N. WELLS.
BERNE TOCCI-GUILBERT.
CONRAD W. RENSTROM.

REFERENCES CITED

The following references are of record in the file of this patent:

UNITED STATES PATENTS

| Number | Name | Date |
| --- | --- | --- |
| 771,261 | Monin | Oct. 4, 1904 |
| 1,868,498 | Gruman | July 26, 1932 |
| 2,110,456 | Wait | Mar. 8, 1938 |
| 2,209,670 | Wait | July 30, 1940 |
| 2,286,694 | Talbot | June 16, 1942 |
| 2,463,604 | Denyssen | Mar. 8, 1949 |
| 2,503,907 | Hefler | Apr. 11, 1950 |